United States Patent [19]
Kohn et al.

[11] Patent Number: 6,082,563
[45] Date of Patent: Jul. 4, 2000

[54] BOTTLE-LIKE PLASTIC CONTAINER AND PROCESS FOR PRODUCING IT

[75] Inventors: Udo Kohn, Darmstadt; Franz Steigerwald, Griesheim, both of Germany

[73] Assignee: Wella Aktiengesellschaft, Darmstadt, Germany

[21] Appl. No.: 08/930,922

[22] PCT Filed: Dec. 7, 1996

[86] PCT No.: PCT/EP96/05485

§ 371 Date: Oct. 3, 1997

§ 102(e) Date: Oct. 3, 1997

[87] PCT Pub. No.: WO97/28050

PCT Pub. Date: Aug. 7, 1997

[30] Foreign Application Priority Data

Feb. 3, 1996 [DE] Germany ............ 196 03 906

[51] Int. Cl.[7] ............... B65D 23/00
[52] U.S. Cl. ............ 215/12.2; 222/215
[58] Field of Search .......... 428/35.3, 34.7, 428/34.9, 36.5, 519; 264/45.9, 46.1, 514; 215/12.2; 222/215

[56] References Cited

U.S. PATENT DOCUMENTS 3,221,954  12/1965  Lux ....................... 215/12.2
4,463,861  8/1984  Tsubone et al. ............ 215/12.2

FOREIGN PATENT DOCUMENTS 1 504 359  4/1964  Germany.

*Primary Examiner*—Philippe Derakshani
*Attorney, Agent, or Firm*—Michael J. Striker

[57] ABSTRACT

A flask-like container (1) of reduced material utilization, which is smooth on the exterior, having a deformable jacket wall (2), by means of which a metering function of a liquid product by means of compression and restoration in connection with a metering opening is provided for single-handed operation, wherein the container (1) essentially is made of foamed plastic and the container (1) is at least partially enclosed by a smooth container decoration (4).

In a method for producing such a container (1), a chemical propellant is introduced into a plastic material (3), thereafter the container (1) is shaped by means of extrusion techniques, and finally the container (1) is enclosed in a smooth container decoration (4).

A rough exterior structure is avoided by means of the enclosure (FIG. 2).

21 Claims, 2 Drawing Sheets

BOTTLE-LIKE PLASTIC CONTAINER AND PROCESS FOR PRODUCING IT

BACKGROUND OF THE INVENTION

1. Field of the Invention

This invention relates to a flask-type container made from plastic/synthetic material.

2. Prior Art

This type of container is already known for products which are discharged by creasing and/or squeezing the container. The containers are made from a compact plastic, usually from polyolefin having a density of 0.9 to 0.97 g/cm$^3$. In an effort to reduce the material used in packaging, experiments have been conducted by reducing the mantle thickness, the mantle being the side wall of the body portion of the container. Reduction of material used in production of packaging has a significant ecological purpose today. Reducing the material used is both ecologically friendly and generally advantageous economically.

The packaging must be recycled. The cost of recycling may be determined based on the weight of the material used. The cost of recycling plastic packaging is very high. In Germany for example, the cost of recycling is even higher than the cost of the packaging material itself. Efforts to reduce the material used mainly in packaging are still limited.

For example, a 250 ml flask may be produced by an optimum process by using under 20 g polypropylene as a weight limit. The flask's mantle has a thickness of around 0.7 mm. An experiment using 15 g of polypropylene has also been performed. The result shows that the wall thickness of the flask's mantle is 0.5 mm. This method and other similar methods of reducing the wall thickness lead to the conclusion that when the flask is used, namely when the product is about to be discharged from the flask, the flask undergoes a cracking effect due to the instability of the flask's mantle. The flask's abilities to crease and recover are adversely changed due to instability of the flask's mantle which has a low resistance to pressure. As a result, the flask does not have an aesthetic shape and the product quality is affected.

It is also known to make a hollow foam body by extrusion blow processing and some additional further processing. A hollow body may be made using only an extrusion blow process—which then becomes a hollow foam body—but in practice, to obtain any shape, in a melt-heating process direct from the extruder, is also required for producing a container for a liquid product, for example for body-care/medicine agents. Another standard process uses a circular or flat half-processed material which process is limited to producing some shapes, such as round or other simple geometrical basic forms. These bodies or, In this case, containers are designed for thermal insulation, for better dimension stability, or for the purpose of coating the container. They are, in part, staple products, such as a jar as described. Their structure has a volume greater than 1 liter and a wall thickness of more than 1.2 mm. however, it is desirable to obtain a low foam density.

In particular, DE-A 15 04 359 discloses that uncontrolled expansion will occur in a trial to achieve a satisfactory low foam density during extrusion blow processing and the wall thickness cannot be regulated. Therefore to overcome this problem, an integrated process to form a solid outer cover and an inner cover is described, which however is limited in its process engineering characteristics and cannot improve the properties of the hollow body, for example the surface or the diffusion-sealing properties. The disadvantage of this process is the length of blowing time required in the extrusion blowing method, which is longer than the normal time usually needed in producing a packaging from the hollow body (DE-A 15 04 359: blowing time=60 seconds).

Foamed containers for packaging are also described. However, they have larger discharge mouths, so that the container coating has no special discharging function, such as deformability and recovery of its initial shape, which must occur for metered delivery of the discharged product. The foamed containers have another disadvantage, namely their surfaces are not smooth. This lessens the acceptability of the product by the consumers.

SUMMARY OF THE INVENTION

Therefore it is an object of this invention to create a kind of container and to find a process for making it, which use a lesser quantity of material, but may overcome the disadvantages mentioned above, and especially it is an object of this invention to produce a container whose surface is smooth.

Thus, in a first aspect of the present invention, a flask-type container, made from plastic material with a squeezable wall is provided, which includes a measuring outlet for measuring liquid product discharged from the flask by squeezing the flask and allowing the flask to recover. This container is made from foamed plastic material and part of the container is covered with a smooth container decoration, characterized by a foamed plastic material density of from 0.7 D to 0.9 D. D is the density of the plastic material In a non-foamed state, in which the container does not require an inner skin of non-foamed material.

In a related aspect a process for producing the plastic container as described and claimed herein is provided. This process is characterized in that a chemical stimulant is introduced into the synthetic or plastic material, the container is then formed by using an extrusion engineering method in which at least part of the container is covered with a smooth container decoration.

Advantageously, according to this invention, a flask-type container for products discharged by the consumer by squeezing the container, may be produced using a smaller quantity of material, i.e. 10% to 30% less. However, the flasks still have aesthetic qualities and function similar to the flasks made from solid plastic and using a larger quantity of material. The flask-type container produced by using less material is equipped with an outlet closure. The shape of the containers wall may be changed when discharging its content through the outlet by squeezing the container by hand. The outlet is smaller than the container body's mantle or jacket. The entire or major part of the container's wall is made from foamed plastic material, mainly foamed polyolefin, such as PP (polypropylene), PE (polyethylene) or their copolymers, the density of the foamed material is 10% to 30% less than the density of the same material which is not foamed. The thickness of the container's wall, like the other existing similar containers, at the mantle area of the container is thinner than 1.5 mm, preferably 0.5 to 1 mm. The container may be made in one processing step, i.e. by extrusion blowing directly from its fused melt. Producing the foam may be done by introducing some chemical stimulants, such as polycarbonate acid and carbonate compound. Using an extruder screw the additive will provide good mixing and a uniform reaction as well as a good distribution of the gas bubbles in the melted plastic. In the case of this invention, this condition is preferable rather than the thinning of common foamed plastic flask's wall in the wall interior by uniformly distributed hollow spaces.

Coating of the container's mantle by using a container decoration becomes easier, since the container's surface is smooth. The container's decoration will make the consumer more familiar with the outer appearance of the container and the manual handling. Consequently, the container decoration may be used to provide information to the consumer.

The container decoration may be produced from a compact material different from the foamed material, which is a maximum 20% of the total wall thickness. The container's decoration may be made from a shrinkable or stretchable plastic, paper or combination of plastic and paper toil. The foil may be shrunk, stuck, stretched or combination thereof for fixing it to the container. The shape of the container may be such that the container may totally be covered with decorative foil. Furthermore, between the container decoration and the foamed wall a thin layer of blocking material made from, for example, PA or EVOH, may be provided to create a barrier against the passage of certain gases or liquid. The introduction of the blocking material on the container decoration may be unnecessary if the decorative foil itself can function as a blocking layer.

Containers made from the foamed plastic in the shape of cups, bowl and the like are also known. These items are usually made from half-processed foils which have been shaped and drawn—most commonly they are made from foamed polystyrene—and have rigid forms. Most of these containers have a wall thickness more than 2 mm. The density of the foamed material is below 50%, and often below 10%, of the density of its original material. Foamed foils with thinner walls are also known. These foils are usually processed to become bags.

Thus, according to this invention, it is now possible to produce a smooth packaging container using up to 30% less material than the material used in producing standard foamed containers. For example, it is possible to produce a 250 ml flask by using 15 g of PP. With such quantity, 0.7 mm wall thickness at the flask's mantle area may be made, where the material from foamed polypropylene has a density of more or less 0.72 g/cm$^3$. The roughness of the Flask's surface structure ("Orange-Peel") caused by the foam may be easily neutralized by covering the surface with a compact smooth container decoration or other different material so that the aesthetic impression as a smooth surface area may reappear.

Only through the described range of density and the specified container decoration, the desired function, such as preventing the cracking effect, and the aesthetic impression, can be achieved. A significant deviation will lead to a degradation in proper handling or simply to a reduction of the product quality.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
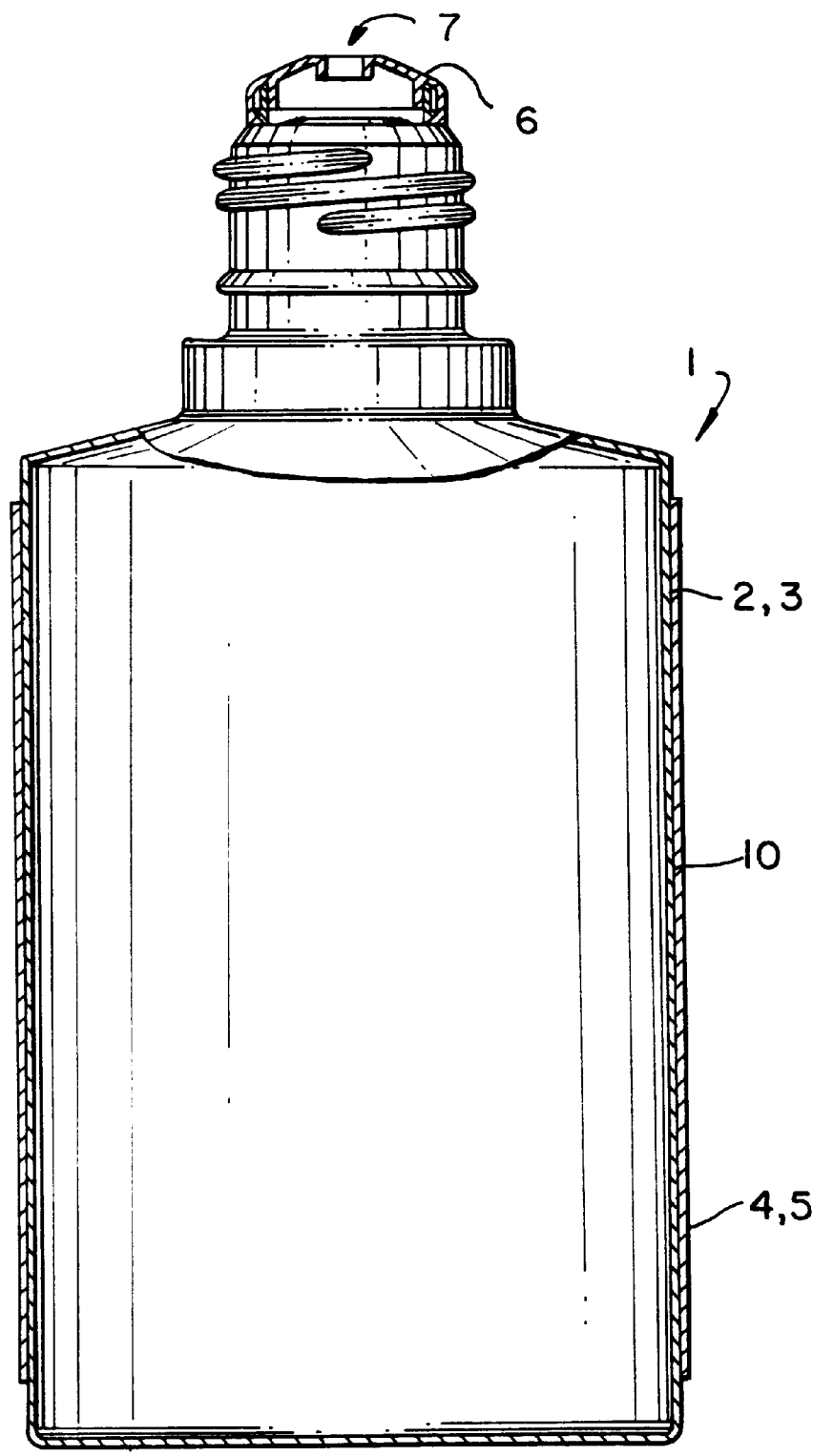
FIG. 1 is partially a side view, partially a vertical cross-sectional view of a flask-type container made from foamed plastic with a container decoration surrounding and stuck onto the container.
Figure 2:
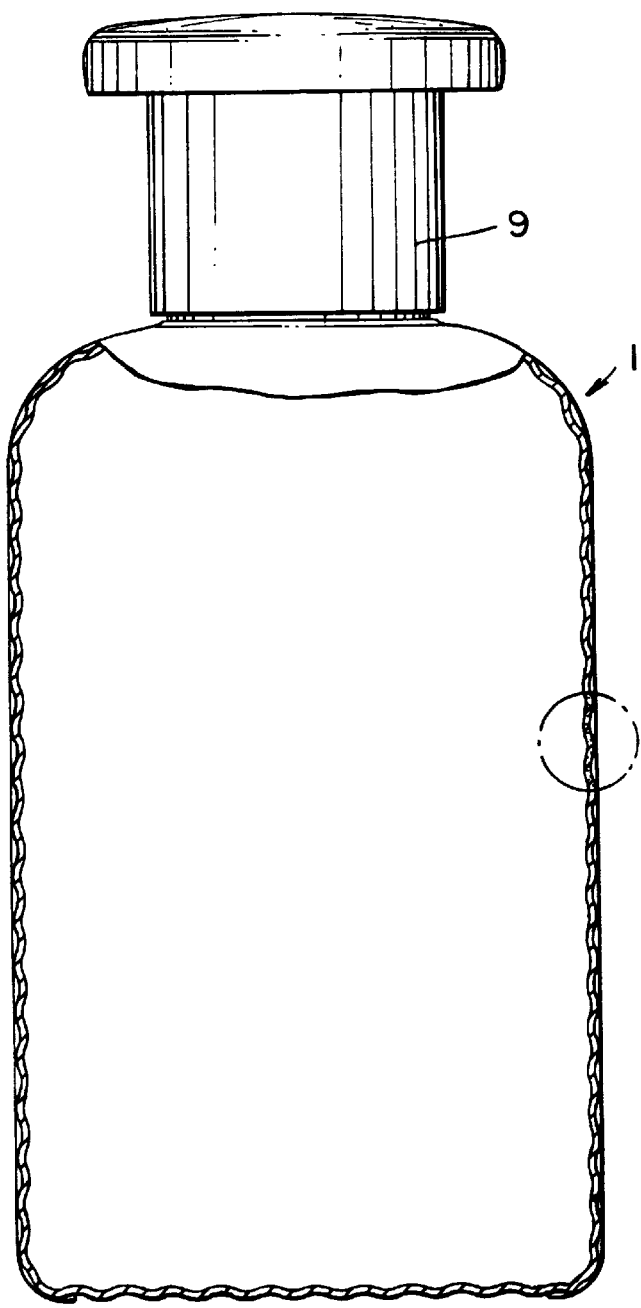
FIG. 2 is partially a side view, partially a vertical cross-sectional view of a foamed container and a closure, including a close up of part of the wall of the container, with the wall cover covered with a shrinkable foil for decoration of the container.
Figure 2A:
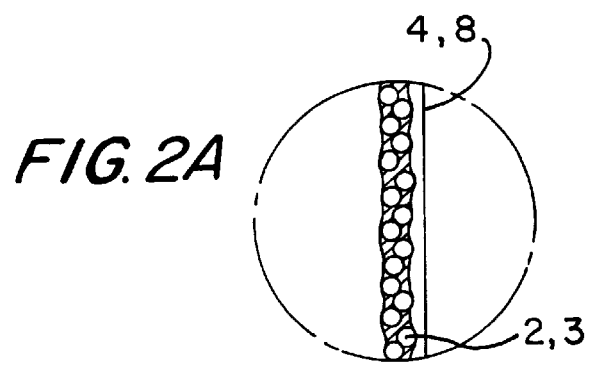

FIG. 1 shows the first and second embodiment of a flask-type plastic container 1 with a squeezable and/or creasable container body wall 2, chiefly made from foamed plastic material and surrounded by a container decoration 4. The foamed plastic material 3 is preferably a polyolefin, such as polypropylene, polyethylene or their copolymers. The plastic material 3 has a minimum density 10% and maximum density 30% less than the density of the same plastic material in a non-foamed state. The thickness of the container body wall 2 is less than 2 mm or between 0.5 and 1 mm. For measuring out liquid product, a gauge or sprayer 6 with a metering outlet 7 is provided. A separate gauge or spraying device 6 is necessary if a smaller bottle outlet is used. The container decoration 4 is made from a plastic/paper compound 5 and is attached to the container 1 by using an adhesive 10. The container 1 shown in FIG. 2 has a shrinkable foil B that is shrunk onto it to decorate the container 4. The container 1 may be closed by means of a closure 9. The foil terminates at the upper part of the container, under the closure 9, so that the flask mantle wall is totally covered.

To have good squeeze and recovery characteristics, the containers have a cross sectional shape that is circular, rectangular or oval, at least in the region of the body wall 2 that is to be squeezed by hand.

What is claimed is:

1. A flask-type container made from a foamed plastic material and comprising a container body having a squeezable side wall, a smooth container decoration covering a part of the container body and a metering outlet for dispensing a liquid product contained therein by squeezing said container body and allowing said container body to recover;
    wherein said foamed plastic material has a density of from 70 to 90% of that of a non-foamed plastic material that is the same as said foamed plastic material except for foaming;
    whereby said container does not require an inner skin of non-foamed material.

2. The flask-type container as defined in claim 1, wherein said foamed plastic material comprises a polyolefin.

3. The flask-type container as defined in claim 2, wherein said polyolefin is selected from the group consisting of polypropylene, polyethylene, copolymers of polypropylene and copolymers of polyethylene.

4. The flask-type container as defined in claim 1, wherein said side wall of said container body has a thickness less than or equal to 1.2 mm for a container volume of about 300 ml.

5. The flask-type container as defined in claim 1, wherein said side wall of said container body has a thickness less than or equal to 1.5 mm for a container volume of about 1000 ml.

6. The flask-type container as defined in claim 1, wherein said container decoration is not foamed.

7. The flask-type container as defined in claim 1, wherein said container decoration is made from said foamed plastic material or another different foamed plastic material.

8. The flask-type container as defined in claim 1, further comprising a blocking layer for blocking gas or liquid diffusion arranged between said container decoration and said side wall of said container body.

9. The flask-type container as defined in claim 1, wherein said container decoration includes a blocking layer.

10. The flask-type container as defined in claim 9 or 8, wherein said blocking layer is made from PA or EVOH.

11. The flask-type container as defined in claim 1, wherein said container body has a transverse cross-section that is round, rectangular or oval.

12. The flask-type container as defined in claim 1, wherein said container decoration is made from a paper or plastic compound.

13. The flask-type container as defined in claim 1, wherein said container decoration comprises a shrinkable foil.

14. The flask-type container as defined in claim 1, wherein said container decoration comprises a stretchable foil.

15. The flask-type container as defined in claim 1, further comprising an adhesive for a fixing said container decoration to said container body and wherein said adhesive is arranged between said container decoration and said side wall of said container body.

16. A process of making a flask-type container, wherein said flask-type container is made from a foamed plastic material and comprises a container body having a squeezable side wall, a smooth container decoration covering a part of the container body and a metering outlet for dispensing a liquid product contained in the container by squeezing the container body and allowing the container body to recover, the foamed plastic material having a density of from 70 to 90% of that of a non-foamed plastic material that is the same as the foamed plastic material except for foaming so that the container does not require an inner skin of non-foamed material; said process comprising the steps of:
   a) introducing a chemical stimulant into said plastic material;
   b) forming said plastic material into the flask-type container by an extrusion engineering method; and
   c) covering at least a part of the container with said smooth container decoration.

17. The process as defined in claim 16, wherein said chemical stimulant is polycarbonate acid or a polycarbonate compound.

18. The process as defined in claim 16, wherein the introducing of the chemical stimulant occurs by means of a screw extruder.

19. The process as defined in claim 16, further comprising a fixing said container decoration on said container body by means of an adhesive.

20. The process as defined in claim 16, wherein said container decoration is a shrinkable foil and further comprising shrinking said shrinkable foil onto said container body.

21. The process as defined in claim 16, wherein said container decoration is a stretchable foil.

* * * * *